UNITED STATES PATENT OFFICE.

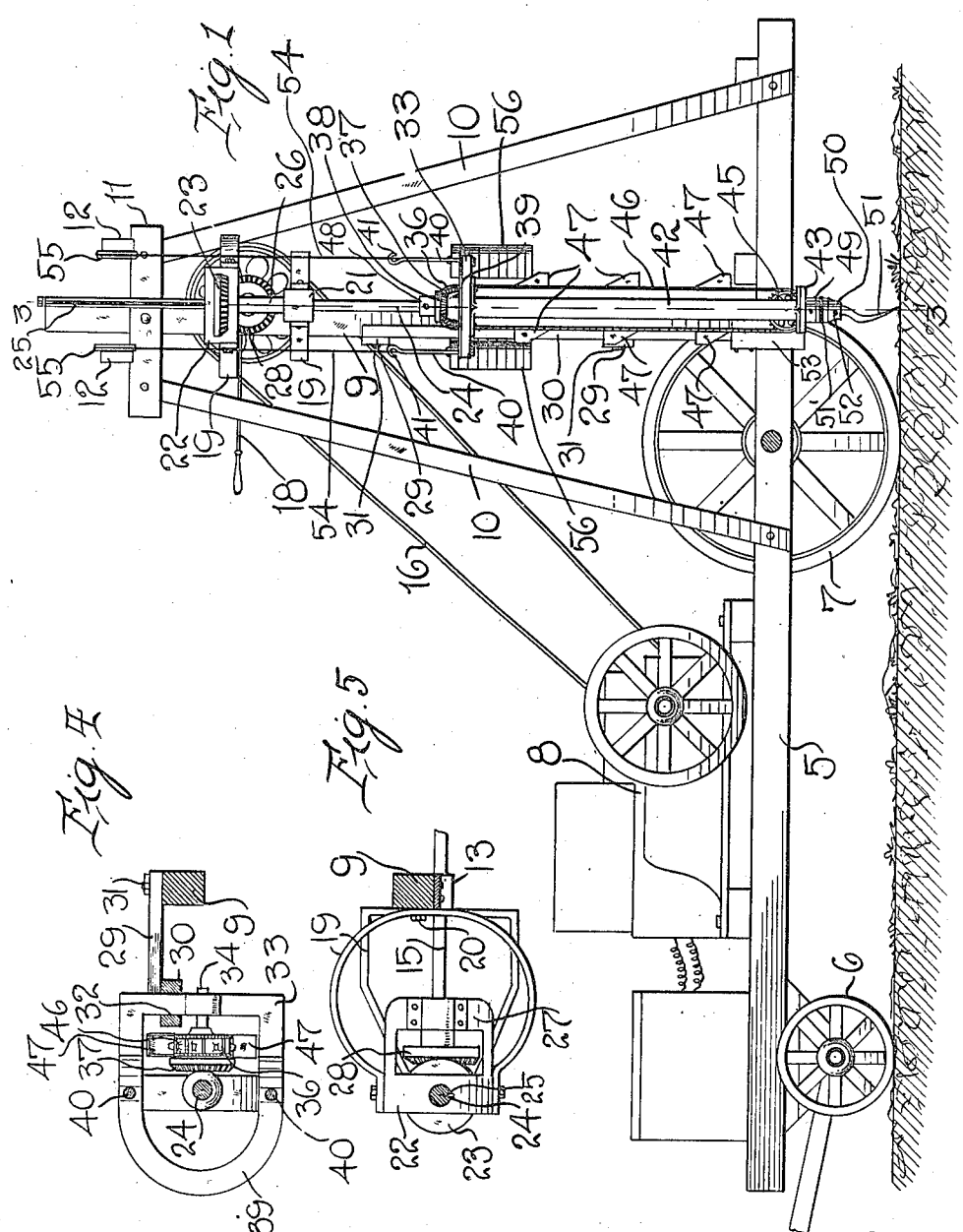

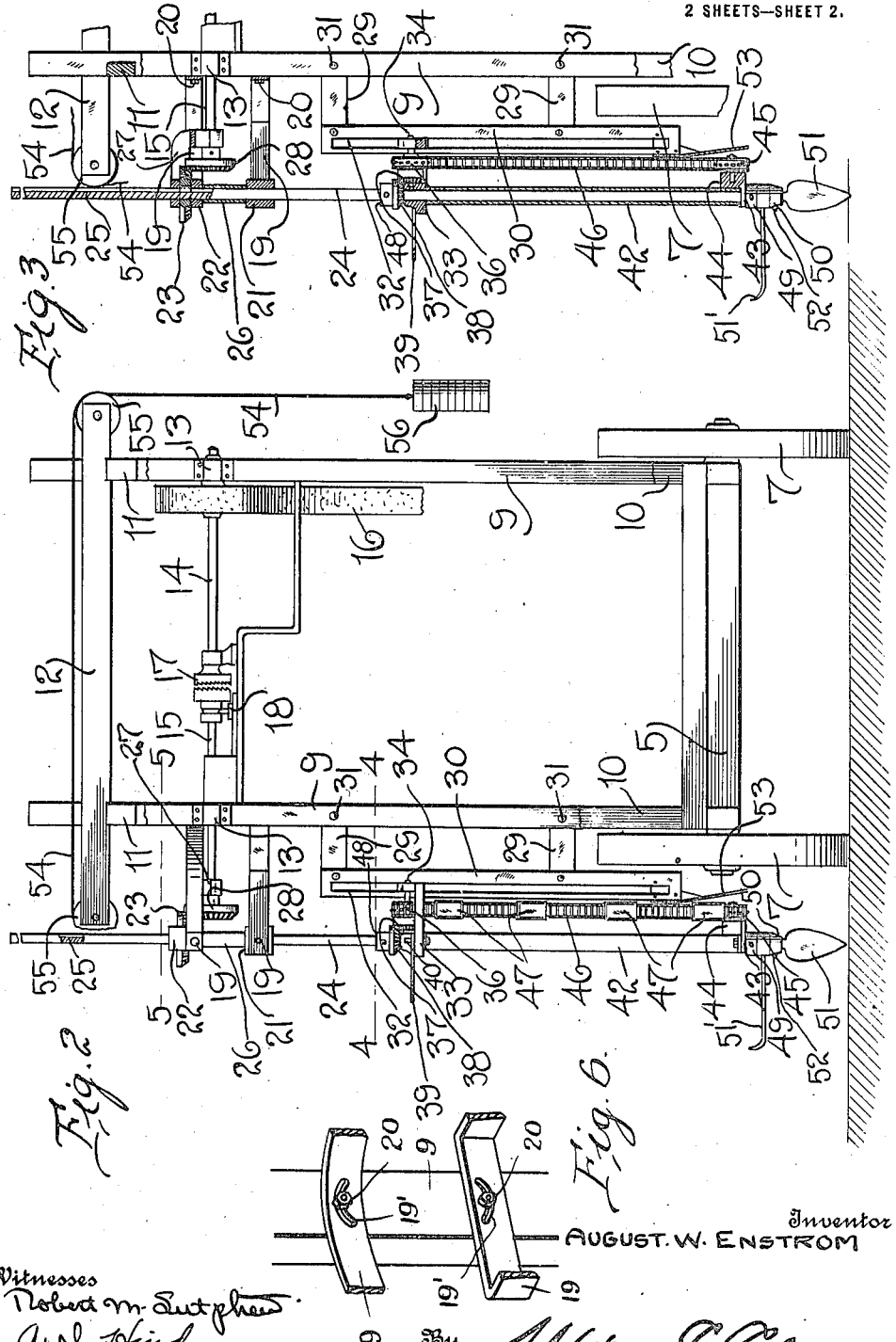

AUGUST W. ENSTROM, OF ROCK ISLAND, ILLINOIS.

HOLE-DIGGING MACHINE.

1,150,180.  Specification of Letters Patent.  Patented Aug. 17, 1915.

Application filed November 11, 1914. Serial No. 871,523.

*To all whom it may concern:*

Be it known that I, AUGUST W. ENSTROM, a citizen of the United States, residing at Rock Island, in the county of Rock Island and State of Illinois, have invented certain new and useful Improvements in Hole-Digging Machines, of which the following is a specification, reference being had to the accompanying drawings.

This invention relates to an improved hole digging machine, and has for its primary object to provide simple, durable, and efficient mechanism for digging holes in the earth for the reception of fence posts, telegraph poles, and similar supports.

The invention has for one of its more particular objects to provide an improved mounting for the excavating mechanism which includes an endless elevator, whereby, as the digging of the hole progresses the material is removed therefrom.

The invention has for a further object to provide a digging or cutting blade fixed upon the lower end of an axially movable spindle, and means for mounting or supporting said spindle in operative connection with the driving gearing whereby the spindle may assume various angular positions without interrupting the driving connection.

The invention has for a further general object to provide a machine of the above character for expeditiously digging holes of a predetermined depth and excavating the earth therefrom, said machine being mounted upon a suitable wheel supported frame, whereby the same may be readily moved from place to place.

With the above and other objects in view, my invention consists in the novel features of construction, combination, and arrangement of parts to be hereinafter more fully described, claimed, and illustrated in the accompanying drawings, in which, Figure 1 is a side elevation of a hole digging machine constructed in accordance with the preferred embodiment of my invention; Fig. 2 is a rear elevation thereof; Fig. 3 is a section taken on the line 3—3 of Fig. 1; Fig. 4 is a section taken on the line 4—4 of Fig. 2; and Fig. 5 is a section taken on the line 5—5 of Fig. 2. Fig. 6 is a detail perspective view of the oscillatory bars 19.

Referring in detail to the drawings, 5 designates a suitable frame mounted upon the front and rear supporting wheels 6 and 7, respectively. Upon this truck frame, an engine indicated at 8, which may be of any approved type, is suitably mounted and secured. Upon the rear end of the frame 5 and on opposite sides thereof, the uprights 9 are securely bolted at their lower ends, said uprights being braced by the truss bars 10. Adjacent to the upper end of each of these uprights, a cross bar 11 is secured, said bars extending longitudinally of the machine. Upon the ends of these bars, transversely extending beams 12 are supported. Upon the uprights 9, suitable bearings 13 are secured, in which are journaled shaft sections 14 and 15, respectively. The shaft section 14 is driven from the engine 8 by a suitable belt 16 and the two shaft sections are adapted to be connected by means of a clutch indicated at 17, the shiftable element of which is actuated by a suitable lever 18. In this manner, it will be understood that power is transmitted to the outer shaft section 15.

Upon one of the uprights 9, a pair of horizontally disposed U-shaped bars 19 is mounted. The intermediate portion of each of these bars is formed with a curved slot 19' to loosely receive a bolt 20 which is removably secured in the upright 9. The bars 19 are, therefore, capable of a turning movement upon the respective bolts. The purpose of this particular mounting of the bars will be better understood as the nature of the invention and the manner in which the same operates is unfolded. Between the spaced outer ends of each of the bars 19, blocks 21 and 22, respectively, are secured. The block 22, mounted between the ends of the uppermost bar 19, is in the form of a rectangular cast metal loop within which a beveled gear 23 is arranged.

The operating spindle or shaft 24 extends through the bearing block 21 in the lower bar 19 and also through the upper rectangular loop or yoke 22 and is provided with a longitudinally extending keyway 25 to receive a key on the gear 23. A suitable spacing sleeve 26 is arranged between the bearing blocks 21 and 22. The upper rectangular block 22 is integrally cast from the arms of the yoke member 27, the intermediate portion of which provides a support for the outer end of the shaft section 15, a suitable bearing cap extending over said shaft and being secured to the yoke member. Upon the outer end of this shaft section, a beveled gear 28 is fixed, for meshing engagement with the gear 23.

Upon the upright 9, spaced outwardly projecting arms 29 are secured, upon which a vertical guide bar 30 is secured. The arms 29 are removably secured on the upright by means of the bolts indicated at 31. The vertical guide bar 30 has a longitudinally extending slot 32 therein. In this slot, the rectangular frame 33 is vertically movable. The opposed parallel portions of this frame are provided with suitable bearings in which the ends of a shaft 34 are journaled. Upon this shaft a sprocket wheel 36 is fixed. One face of this wheel is provided with beveled gear teeth 37 with which the teeth of a beveled gear 38 fixed upon the vertical shaft 24, engage. The ends of an outwardly projecting U-shaped bar 39 are secured upon the opposite ends of the frame 33 by vertical bolts 40, the upper ends of which are formed into eyes 41. Below the frame 33, the shaft 24 extends through a tubular casing 42, the upper end of said casing being split to provide oppositely disposed attaching plates thereon which are secured to the frame. The lower end of this casing is similarly split and secured to a plate 43 which is provided with an upstanding bearing 44, inwardly of the shaft casing. In this bearing, an arbor is journaled, upon which a sprocket wheel 45 is secured. A chain 46 traverses this sprocket wheel and the upper sprocket wheel 36 and upon said chain a plurality of spaced buckets 47 are suitably secured. A collar 48 is secured upon the vertical shaft 24 above the gear 38 by means of a suitable set screw, and a similar collar 49 is likewise secured upon the lower end of said shaft immediately beneath the bearing plate 43. By means of these collars, the shaft is held against longitudinal shifting movement with relation to the casing 42 through which it extends. Upon the lower end of the shaft 24, a sleeve or hub member 50 is keyed, and in this sleeve, the digging blade or tool 51 is removably secured by means of the set screw 52. A series of these blades may be provided for use in the machine, and they are preferably of triangular shape or form, as shown. A horizontally disposed cutting blade 51' is also carried by the member 50 and in the operation of the machine, cuts through the earth so that a hole of the desired diameter will be formed. Upon the lower end of the vertical guide bar 30, a downwardly and inwardly inclined plate 53 is secured. This plate, when the machine is in operation, is disposed at the edge of the hole or excavation and serves to prevent stones or large clods of earth falling into the same and upon the elevator buckets, thereby obviating liability of serious injury to the latter.

To each of the eye bolts 40, one end of a rope or other flexible element 54 is secured, and these ropes pass around guide sheaves or pulleys 55 which are mounted upon the opposite ends of the transverse beams 12. To the other ends of said ropes, weights 56 are attached, said weights counterbalancing the weight of the operating mechanism just described and normally holding the same against gravity movement upon the vertical guide bar 30.

Bearing the foregoing description in mind, the operation of the machine will be understood as follows: After a suitable digging blade has been connected to the lower end of the shaft or spindle 24 to produce an excavation of the desired diameter, the engine is set in operation. By simply grasping the outwardly projecting bar 39 and forcing it downwardly, the shaft 24 will be lowered and the digging blade 51 engaged with the ground. The earth which is excavated by this blade, is received in the several buckets upon the elevating chain 46, as the buckets move around the lower sprocket wheel 45, the said earth being dumped or discharged from said buckets at the upper end of the elevator, as will be readily understood. As the work progresses and the hole increases in depth, the operator continues to lower or force downwardly upon the shaft 24. In this manner, it will be apparent that the hole for the reception of the post may be very quickly dug and the earth removed therefrom. The entire mechanism may be easily and quickly removed from the supporting truck and the engine employed for other purposes by simply removing the bolts which connect the U-shaped bars 19 to the upright 9, and also removing the bolts which secure the arms 29 to said uprights. If it is not desired to remove the digging mechanism, the shaft section 15 may be readily disconnected from the section 14 by the operator shifting the clutch, and another belt connected to the engine shaft and extended rearwardly between the uprights to the machine which it is desired to operate. The pivotal mounting of the bars 19 permits of the use of the machine upon uneven ground, the vertical operating shaft, notwithstanding such unevenness of the ground, still maintaining its true vertical position.

From the foregoing description, taken in connection with the accompanying drawings, the construction, manner of operation, and several advantages of the invention will be readily understood. The machine may be readily moved by one man from place to place, and holes of various depths expeditiously dug in the ground to receive telegraph or telephone posts, fence posts, or any other supports which are to be mounted or anchored below the ground surface. My invention also consists of comparatively few elements which are all of simple form and it will, therefore, be appreciated that the machine can be manufactured at small cost.

While I have shown and described the preferred construction and arrangement of the several elements employed, the device is, nevertheless, susceptible of considerable modification therein, and I, therefore, reserve the privilege of resorting to all such legitimate changes as may be fairly embodied within the spirit and scope of the invention as claimed.

Having thus fully described my invention, what I desire to claim and secure by Letters Patent is:—

1. In a machine of the character described, a supporting frame, spaced oscillatory bars mounted in said frame, bearings swiveled upon said bars, a shaft axially movable through said bearings, a bevel gear mounted in one of the bearings and keyed upon said shaft, a power transmission shaft mounted in the swiveled bearing and provided with a gear engaging said bevel gear, means for guiding the shaft in its vertical movement with respect to the frame, an elevator carried by said shaft in its vertical movement, said elevator being geared to the shaft and driven thereby, and counterbalancing means yieldingly holding the shaft and the elevator against downward movement with respect to the frame.

2. In a machine of the character described, a supporting frame, a shaft bearing mounted upon the frame for angular movement with respect thereto, a shaft mounted for rotation and axial movement in said bearing, a casing through which said shaft extends, a stationary slotted guide fixed to the frame, means on the casing movable in said guide but permitting of the swinging movement of the shaft and the casing, and an elevator mounted upon said casing and movable with the same and the shaft.

3. In a machine of the character described, a supporting frame, a horizontally disposed U-shaped bar mounted for oscillatory movement upon the frame, a bearing member swiveled between the ends of said bar, a vertically disposed shaft axially movable through the bearing member, a gear mounted in the bearing member and keyed upon said shaft, a power transmission shaft mounted in said bearing member and provided with a gear meshing with said first named gear, a casing on said shaft, means for preventing axial movement of the casing with respect to the shaft, a stationary guide fixed to the frame, means secured upon the upper end of said casing engaged in said guide, an elevator mounted upon the casing and geared to said shaft, and means connected to the upper end of said casing and normally holding the same and the shaft in an elevated position.

4. In a machine of the character described, a supporting frame, a shaft bearing mounted upon the frame for angular movement with respect thereto, a shaft mounted for rotation and axial movement in said bearing, a casing through which said shaft extends, means for preventing axial movement of the shaft with respect to said casing, a stationary guide on the frame, means fixed to the upper end of the casing loosely engaged in said guide to permit of the swinging movement of the shaft and the casing and also their vertical movement with respect to the frame, an elevator mounted upon said casing for vertical movement therewith, flexible elements connected to the casing, guide means for said elements, and weights attached to said elements to counterbalance the casing and associated parts and yieldingly hold the same against vertical movement.

In testimony whereof I hereunto affix my signature in the presence of two witnesses.

AUGUST W. ENSTROM.

Witnesses:
LILLIAN M. DEISENROTH,
K. T. ANDERSON.